March 8, 1960 G. F. BOWMAN 2,927,619
RESILIENT WHEEL
Filed Oct. 23, 1958
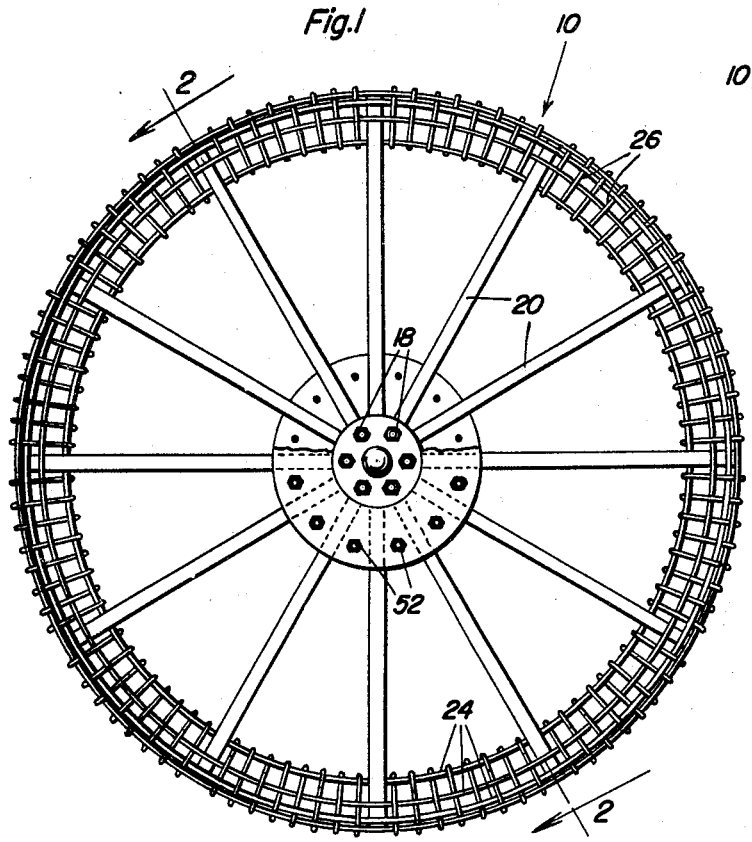
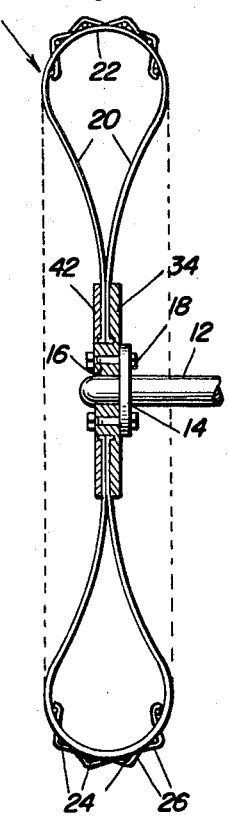
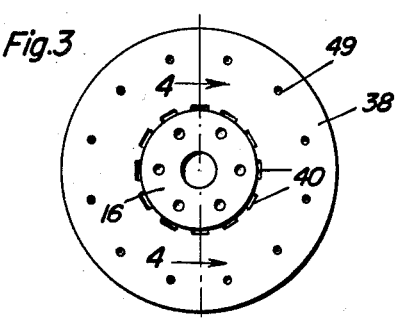
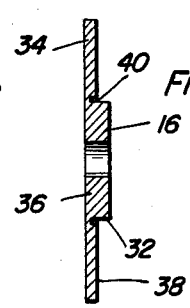
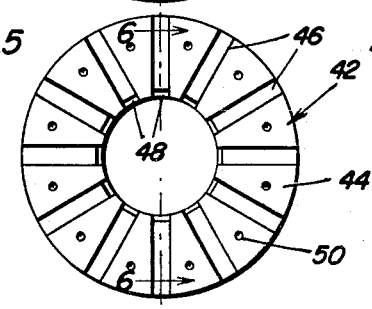
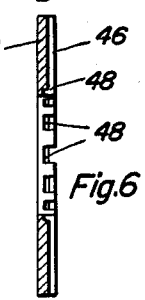
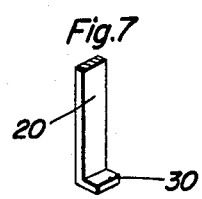
George F. Bowman
INVENTOR.

United States Patent Office 2,927,619
Patented Mar. 8, 1960

2,927,619
RESILIENT WHEEL

George F. Bowman, San Jose, Costa Rica

Application October 23, 1958, Serial No. 769,241

14 Claims. (Cl. 152—11)

This invention comprises a novel and useful resilient wheel and more particularly relates to a wheel for supporting vehicles and machinery with an improved cushioning action and an increased traction.

The primary purpose of this invention is to provide a supporting wheel for vehicles and machinery which shall be more resilient in nature to thereby cushion the vehicle or machine with which it is associated.

A further object of the invention is to provide a resilient wheel in accordance with the preceding object which will provide a greatly increased traction upon the ground, even under soft footing and the like.

A further object of the invention is to provide a resilient wheel construction which shall be of very simple but extremely durable construction.

A more specific purpose of the invention is to provide a resilient wheel which shall be constructed substantially entirely of steel or spring steel elements with a view to increasing the over-all structural strength of the wheel, reducing its cost of manufacture, greatly increasing the life of the wheel, enhancing its performance both from the standpoint of resiliency and from that of traction with the ground.

A further specific object of the invention is to provide a resilient wheel wherein the spokes comprise U-shaped resilient straps with their midportions disposed at the rim of the wheel and whereby the midportions of the spokes are connected together by a rim construction of a woven mesh character.

A still further specific object of the invention is to provide a resilient wheel construction in accordance with the preceding objects wherein the spokes of the wheel are securely clamped to the hub thereof in a simple but highly effective manner.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of a wheel in accordance with this invention;

Figure 2 is a vertical sectional view through a diameter of the wheel as taken substantially upon the plane indicated by the section line 2—2 of Figure 1;

Figure 3 is an elevational view of the hub of the wheel;

Figure 4 is a vertical sectional view taken upon a diameter upon the plane indicated by the section line 4—4 of Figure 3;

Figure 5 is an elevational view of a clamping ring by which the spokes of the wheel are secured to the hub;

Figure 6 is a vertical sectional view taken along a diameter of the clamping ring and substantially upon the plane indicated by the section line 6—6 of Figure 5; and Figure 7 is a perspective view of an end of one of the spokes showing the structure by which it is anchored in the hub member.

The fundamental and basic purpose of this invention is to provide a resilient steel wheel construction capable of producing an extremely good traction effect even in soft or slippery surfaces, and which shall be extremely resilient both to radial or to axial forces to which the wheel may be subjected. While the greatest utility contemplated for this wheel is its use on tractors, trailers, farm machinery or other heavy equipment, by virtue of its ability to provide an extremely wide tread and great tractive effect, it may also be adapted for automotive or vehicle use owing to its extreme resiliency and cushioning action.

In the embodiment illustrated the wheel designated generally by the numeral 10 is shown as mounted upon an axle 12 for rotation therewith. This axle includes an integral flange 14 to which the hub of the wheel indicated by the numeral 16 may be removably secured as by clamping bolts or the like 18.

The wheel consists of a plurality of radially extending spokes which are U-shaped in configuration, having each a pair of legs 20 with their ends secured to the hub as set forth hereinafter, and being provided with a midportion 22 disposed at the periphery of the wheel. Preferably these spokes are composed of steel straps of spring steel of any suitable thickness.

The ends of these legs are clamped together in side-by-side abutting relation at the hub of the wheel as shown in Figure 2 to thus rigidly secure the inner ends of the legs and thereby provide a relative stiffening effect of the resilient spokes adjacent the hub. At their outer ends, or from their clamped hub portions, the legs 20 are outwardly divergent as shown in Figure 2 so as to provide a midportion in the form of a loop which is considerably laterally enlarged in the direction of the axis of the hub and axle. The extent of this lateral enlargement can be varied as circumstances require, it being apparent that this lateral enlargement accompanied by radial deflection of the rim portion of the wheel under the load carried thereby will increase the area of contact of the wheel with the ground thereby improving the traction of the same, and will also cushion its load and reduce the weight of the load for a given area of the ground over which the wheel rests.

The reticulated rim of the wheel includes a plurality of rings or bands 24 in the form of circles of rods, bars or the like and which are disposed in parallel relation to the medial plane of the wheel and its hub. These rings are of progressively increasing diameter as they are positioned more closely adjacent to this medial plane so that when they are connected by a plurality of arcuate transverse cross members 26, they will produce a rim which in cross-section is arcuate and which is of a wire mesh or grid-like character.

Obviously, the cross-members and the rings may be united to each other and to the midportions 22 of the spokes in any desired manner, as by welding or the like.

In some instances it may be preferred to replace the wire mesh rim with tread surfaces of other material such as a solid spring metal rim, upon which a pneumatic tire or the like may be mounted if desired. In general, however, it is preferred that the metallic mesh construction of the rim shall be employed as the ground engaging tread of the wheel.

As shown best in Figure 7 and as also apparent from Figure 2, the inner ends of the legs 20 are provided with lateral projections or flanges as shown at 30. These flanges serve to lock the legs from radial movement with respect to the hub in a manner to be now described.

As previously mentioned, the hub 16 is received upon and mounted to a coupling plate 14 on the axle or shaft 12 as by fasteners 18. The hub comprises a cylindrical disk having a cylindrical periphery 32 and there is a radially extending annular flange or plate 34 projecting from this periphery and along a side face 36 of the hub, which side face is secured against the coupling flange 14 previously mentioned. The opposite face of the flange 34 provides an annular surface 38. This surface is provided at its junction with the peripheral surface 32 of the hub with a series of axially extending recesses or pockets 40 into which those flanges 30 of the adjacent legs 20 of the spokes may be received with the surface of the spoke 20 being disposed against the surface 38. It will thus be apparent that the legs which are adjacent to the flange 34 are locked thereto against radial displacement with the outer surfaces of these legs resting against the surface 38.

There is further provided a clamping ring or plate designated by the numeral 42 and which has a surface 44 which is opposed to the surface 38. The surface 44 is provided with a plurality of radially extending channels or recesses 46 therein of sufficient thickness to receive therein the end portions of one or both of the legs 20 of a spoke. At the inner extremities of these channels there is also provided the axially extending recesses or pockets 48 similar to those shown at 40 on the plate 34 and for the same purpose.

Aligned apertures 48 and 50 are provided in the plates or flanges 34 and 42 through which the clamping bolts 52 pass as shown in Figure 1.

It will thus be observed that the hub is provided with a clamping means whereby the inward extremities of the pair of legs of each spoke are securely clamped, retaining these extremities against either circumferential displacement by virtue of the channels 46, and against radial displacement by virtue of the recesses 40 and 48. This clamping action as above mentioned greatly stiffens the spokes at their extremities adjacent the hub thereby providing the desired increased rigidity of the wheel at this position, without detracting from the resiliency of the wheel at its rim portion for either axial or radial deflection.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A resilient wheel comprising a hub adapted for mounting upon an axle, a plurality of U-shaped resilient spokes having each a pair of legs and a bowed midportion, means securing said legs to said hub, said legs being divergent from said hub to said midportion whereby to provide a lateral enlargement extending axially of said hub, a reticulated rim secured to said midportions of said spokes.

2. The combination of claim 1 wherein said rim is arcuate in cross-section.

3. The combination of claim 1 wherein said rim comprises wire mesh.

4. The combination of claim 1 wherein said legs are clamped into side-by-side abutting engagement by said securing means thereby increasing the rigidity of the spokes adjacent said hub.

5. The combination of claim 1 wherein said hub includes a cylindrical disk having a circular flange extending radially from one side thereof, said securing means comprising a clamping ring received on the circumference of said disk and having a face opposed to that of said flange and clamping said legs therebetween.

6. The combination of claim 5 wherein at least one of said opposed faces has radially extending slots therein receiving and retaining said legs.

7. The combination of claim 5 including lateral projections on said legs, one of said opposed surfaces having recesses receiving and retaining said projections.

8. The combination of claim 1 wherein said rim comprises a plurality of circular rings disposed in planes parallel to the medial plane of said wheel, arcuate cross members attached to said rings.

9. The combination of claim 8 wherein said rings are of progressively increasing diameter as they approach said medial plane.

10. A resilient wheel comprising a hub adapted for mounting upon an axle, a plurality of U-shaped resilient spokes having each a pair of legs and a bowed midportion, means securing said legs to said hub, said legs being divergent from said hub to said midportion whereby to provide a lateral enlargement extending axially of said hub, a rim secured to said midportions of said spokes, said legs being clamped into side-by-side abutting engagement by said securing means thereby forming reverse curves in said spokes and increasing their resiliency of the latter.

11. The combination of claim 10 wherein said rim is reticulated and arcuate in cross-section.

12. The combination of claim 10 wherein said hub includes a cylindrical disk having a circular flange extending radially from one side thereof, said securing means comprising a clamping ring received on the circumference of said disk and having a face opposed to that of said flange and clamping said legs therebetween.

13. The combination of claim 12 wherein said rim comprises a plurality of circular rings disposed in planes parallel to the medial plane of said wheel, arcuate cross members attached to said rings.

14. The combination of claim 13 wherein each of said arcuate cross members are interwoven across said rings.

References Cited in the file of this patent

UNITED STATES PATENTS

| | | |
|---|---|---|
| 988,952 | Sharp | Apr. 4, 1911 |
| 1,045,533 | Eckart | Nov. 26, 1912 |
| 1,074,787 | Godley | Oct. 7, 1913 |
| 1,324,395 | Griffin | Dec. 9, 1919 |

FOREIGN PATENTS

| | | |
|---|---|---|
| 3,807 | Great Britain | 1914 |
| 222,293 | Great Britain | Oct. 2, 1924 |